United States Patent
Gilbert et al.

(10) Patent No.: US 10,222,822 B2
(45) Date of Patent: *Mar. 5, 2019

(54) PHOTONIC QUANTUM MEMORY WITH POLARIZATION-TO-TIME ENTANGLEMENT CONVERSION AND TIME-TO-POLARIZATION ENTANGLEMENT CONVERSION

(71) Applicant: The MITRE Corporation, McLean, VA (US)

(72) Inventors: Gerald N. Gilbert, McLean, VA (US); Jonathan S. Hodges, McLean, VA (US); Stephen Peter Pappas, McLean, VA (US); Yaakov Shmuel Weinstein, McLean, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,039

(22) Filed: Dec. 22, 2017

(65) Prior Publication Data

US 2018/0136688 A1 May 17, 2018

Related U.S. Application Data

(63) Continuation of application No. 13/856,218, filed on Apr. 3, 2013, now Pat. No. 9,851,742.

(Continued)

(51) Int. Cl.
*G11C 13/04* (2006.01)
*G02F 1/31* (2006.01)
(Continued)

(52) U.S. Cl.
CPC ............... *G06E 1/00* (2013.01); *B82Y 10/00* (2013.01); *G02F 1/0136* (2013.01);
(Continued)

(58) Field of Classification Search
CPC ... G11C 13/044; G11C 13/047; G02F 1/0136; G02F 1/3131; G02F 1/3132; G02F 1/31
See application file for complete search history.

(56) References Cited

U.S. PATENT DOCUMENTS 6,473,719 B1 10/2002 Steenblik
7,019,875 B2 3/2006 Pittman et al.
(Continued)

FOREIGN PATENT DOCUMENTS

WO    WO 2008/142389 A1    11/2008

OTHER PUBLICATIONS

Hodges, J.S. et al., "Polarization/Time-bin basis conversion of entangled photons," *CLEO Technical Digest*, OSA, 2 pages, 2012.
(Continued)

*Primary Examiner* — Andrew Q Tran
(74) *Attorney, Agent, or Firm* — Sterne, Kessler, Goldstein & Fox, PLLC

(57) ABSTRACT

A photonic quantum memory is provided. The photonic quantum memory includes entanglement basis conversion module configured to receive a first polarization-entangled photon pair and to produce a second entangled photon pair. The second polarization-entangled photon pair can be a time-bin entangled or a propagation direction-entangled photon pair. The photonic quantum memory further includes a photonic storage configured to receive the second entangled photon pair from the basis conversion module and to store the second entangled photon pair.

20 Claims, 9 Drawing Sheets

Related U.S. Application Data

(60) Provisional application No. 61/645,381, filed on May 10, 2012.

(51) Int. Cl.

| | | |
|---|---|---|
| *G06E 1/00* | (2006.01) | |
| *G02F 1/39* | (2006.01) | |
| *H04L 9/08* | (2006.01) | |
| *G06N 99/00* | (2019.01) | |
| *B82Y 10/00* | (2011.01) | |
| *G02F 1/01* | (2006.01) | |
| *G02F 1/35* | (2006.01) | |
| *G02F 1/355* | (2006.01) | |

(52) U.S. Cl.
CPC .......... *G02F 1/3526* (2013.01); *G02F 1/3551* (2013.01); *G02F 1/39* (2013.01); *G06N 99/002* (2013.01); *G11C 13/04* (2013.01); *G11C 13/048* (2013.01); *H04L 9/0852* (2013.01)

(56) References Cited

U.S. PATENT DOCUMENTS

| | | | |
|---|---|---|---|
| 7,266,303 | B2 | 9/2007 | Linden et al. |
| 8,605,288 | B2 | 12/2013 | Bennett et al. |
| 9,720,437 | B2 * | 8/2017 | Gilbert .................. G06E 1/00 |
| 9,851,742 | B2 * | 12/2017 | Gilbert .................. G06E 1/00 |
| 2004/0042715 | A1 | 3/2004 | Linden et al. |
| 2005/0111665 | A1 | 5/2005 | Ichimura et al. |
| 2005/0151093 | A1 | 7/2005 | Zaugg |
| 2009/0022322 | A1 | 1/2009 | Trifonov |
| 2009/0097650 | A1 | 4/2009 | Cornwall |
| 2010/0111303 | A1 | 5/2010 | Finlayson et al. |
| 2010/0157310 | A1 | 6/2010 | Bennett et al. |
| 2010/0309469 | A1 | 12/2010 | Kanter et al. |
| 2011/0032532 | A1 | 2/2011 | Hirano et al. |
| 2011/0170695 | A1 | 7/2011 | Fujiwara et al. |
| 2012/0177201 | A1 | 7/2012 | Ayling et al. |
| 2013/0258453 | A1 | 10/2013 | Arahira |
| 2013/0301094 | A1 | 11/2013 | Gilbert et al. |

OTHER PUBLICATIONS

Ikuta, R. et al., "Wide-band quantum interface for visible-to-telecommunication wavelength conversion," *Nature Communications*, 5 pages, Nov. 15, 2011.

Johnston, H., "Entangled memory is a first," printed from http://physicsworld.com/cws/article/news/2008/mar/06/entangled-memory-is-a-first, 4 pages, Mar. 6, 2008.

Ling, A. et al., "Absolute rate of SPDC into single transverse Gaussian modes," *CLEO/QELS*, San Jose, 18 pages, May 2008.

Marcikic, I. et al., "Time-bin entangled qubits for quantum communication created by femtosecond pulses," *Physical Review A*, vol. 66, Jun. 23, 2008, 6 pages, 2002.

Pittman, T.B., et al., "Probabilistic quantum logic operations using polarizing beam splitters," *Physical Review A*, vol. 64 Jun. 23, 2011, 9 pages, 2001.

Reck, M.H.A, *Quantum Interferometry with Multiports: Entangled Photons in Optical Fibers*, Dissertation, zur Erlangung des akademishcen Grades eines Doktros der Naturwissenschaften eingereicht von, pp. 1-168, Jul. 1996.

Zhang, Q. et al., "Generation of 10-GHz clock sequential time-bin entanglement," Optical Society of America, 6 pages, 2007.

Zukowski, M. et al., "Event-ready Detectors Bell Experiment via Entanglement Swapping," *Physical Review Letter*, vol. 71, No. 26, pp. 4287-4290, Dec. 27, 1993.

* cited by examiner

PHOTONIC QUANTUM MEMORY WITH POLARIZATION-TO-TIME ENTANGLEMENT CONVERSION AND TIME-TO-POLARIZATION ENTANGLEMENT CONVERSION

CROSS-REFERENCE TO RELATED APPLICATION(S)

The present application is a continuation of U.S. patent application Ser. No. 13/856,218, filed on Apr. 3, 2013 and titled "Photonic Quantum Memory with Time-Bin Entangled Photon Storage," which claims the benefit of U.S. provisional application No. 61/645,381, filed May 10, 2012, which are both incorporated herein by reference in their entireties.

The present application is related to U.S. non-provisional application Ser. No. 13/856,213, filed Apr. 3, 2013, entitled "Method and Apparatus for Quantum Mechanical Entanglement Protection," which is incorporated herein by reference in its entirety.

FIELD OF THE INVENTION

The present invention relates generally to photonic quantum memory.

BACKGROUND

To accomplish any significant quantum computation, one must manipulate many more than two quantum bits (qubits). An essential component of a quantum computing architecture is therefore a quantum memory, which is distinguished from a classical memory by its need to preserve quantum state entanglement and coherence.

BRIEF SUMMARY

Embodiments for a photonic quantum memory are provided herein. Embodiments can work with single photons or entangled photons as carriers of qubits. Embodiments preserve the entanglement of stored qubits and do not affect the states of individual qubits adversely. In the case of a photonic system, this means that the photonic memory does not introduce phase or polarization changes in the individual photonic qubits during storage. To allow universal computation, embodiments are configured/designed to: trap photons on request; release trapped photons on request; maintain the quantum state of stored photons; maintain entanglement; and have minimal absorption losses. As further described below, embodiments can be used to store photon pairs entangled according to various bases, including time-bin and propagation vector.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Figure 1:
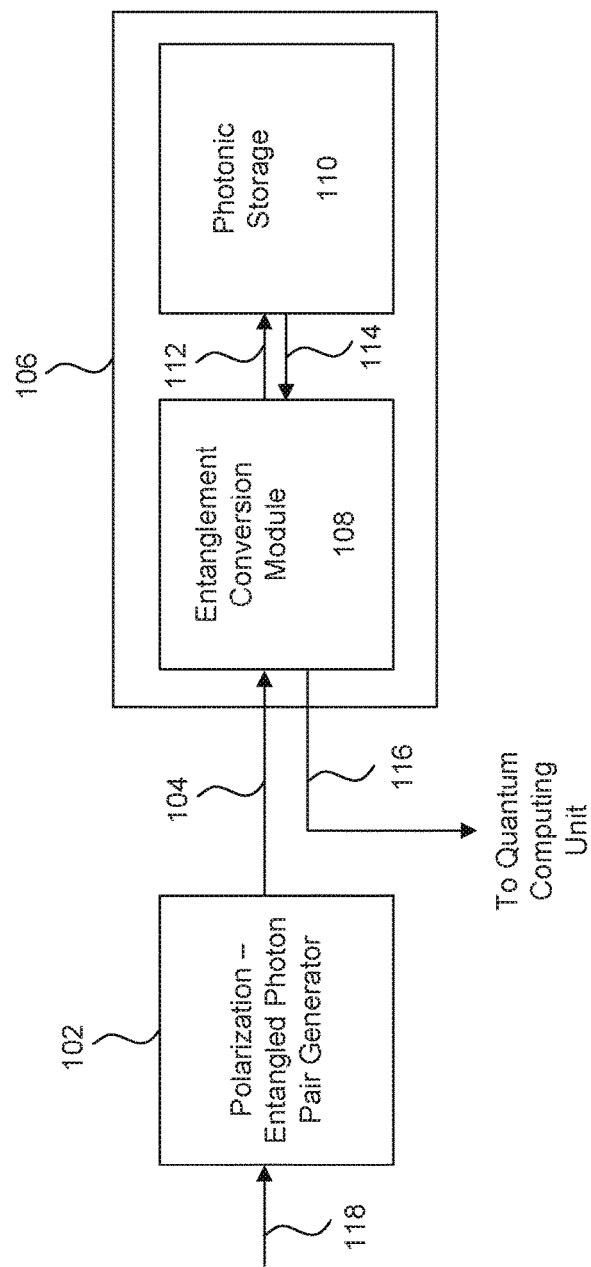
FIG. 1 illustrates an example photonic quantum mechanical memory setup according to an embodiment.

Embodiments for a photonic quantum memory are provided herein. Embodiments can work with single photons or entangled photons as carriers of quantum information. Embodiments preserve the entanglement of stored qubits and do not affect the states of individual qubits adversely. In the case of a photonic system, this means that the photonic memory does not introduce phase or polarization changes in the individual photonic qubits during storage. To allow universal computation, embodiments are configured/designed to: trap photons on request; release trapped photons on request; maintain the quantum state of stored photons; maintain entanglement; and have minimal absorption losses. As further described below, embodiments can be used to store photon pairs entangled according to various bases, including time-bin and propagation vector.

Photonic entanglement can theoretically exist in many different photonic degrees of freedom (bases), including, but not limited to, polarization, energy, wavelength, orbital angular momentum and time. Generally, polarization-based photonic entanglement is desirable because photon polarization is relatively easier to measure than other photonic properties and is easier to manipulate for information processing purposes. As such, the polarization-entangled photon pair is today a promising quantum information resource for future quantum computation, simulation, and sensing applications. However, polarization-based photonic entanglement is highly susceptible to birefringence, which severely limits its storage lifetime in fiber. Specifically, when photons are stored in a strained glass medium (e.g., optical fiber loop), the interaction between the glass and the photons results in two different indices of refraction depending on polarization (parallel or perpendicular to the strain) (which result in vertically-polarized and horizontally-polarized photons traveling at different speeds within the glass medium). This results in a polarization-entangled photon pair (i.e. one whose entanglement is defined in terms of polarization) quickly losing its entanglement and, consequently, any quantum information is degraded with respect to quantum computational use.

Time-bin (or time-based) photonic entanglement is defined with respect to a time value associated with a photonic wave packet, where the time value may correspond, for example, to the peak electric field amplitude of the photonic wave packet. While, in general, time-bin photonic entanglement is more difficult to produce initially in a controlled manner than polarization-based entanglement, time-bin photonic entanglement is substantially unaffected by birefringence, making it a good qubit candidate for storage. Indeed, despite typical glass imperfections, photons with the same polarization all propagate at the same group velocity in a glass medium and thus maintain their separation in time. As such, a time-bin entangled photon pair, whose entanglement is defined in terms of the time separation between its two entangled photonic wavepackets, is able to maintain its entanglement when traveling in fiber much longer than a polarization-entangled photon pair.

FIG. 1 illustrates an example quantum mechanical memory setup 100 according to an embodiment. Example setup 100 is provided for the purpose of illustration only and is not limiting of embodiments. As shown in FIG. 1, example setup 100 includes a polarization-entangled photon generator 102 and a photonic quantum memory 106. Photonic quantum memory 106 includes an entanglement conversion module 108 and a photonic storage 110.

Polarization-entangled photon pair generator 102 may include a spontaneous parametric downconversion (SPDC) source as described U.S. non-provisional application no. TBD, filed Apr. 3, 2013, entitled "Method and Apparatus for Quantum Mechanical Entanglement Protection," which is incorporated herein by reference in its entirety. As such, generator 102 is configured to receive a pump laser beam 118 and to produce polarization-entangled photon pairs, such as polarization-entangled photon pair 104.

Entanglement conversion module 108 is configured to receive polarization-entangled photon pair 104 from generator 102 and to produce an entangled photon pair 112 having entanglement purely in a basis other than the polarization basis. Conversely, entanglement conversion module 108 is configured to receive an entangled photon pair 114 having entanglement purely in a basis other than the polarization basis and to produce a polarization-entangled photon pair 116. Polarization-entangled photon pair 116 may be forwarded to a quantum computing unit, for example.

In an embodiment, module 108 includes a polarization-to-time-bin entanglement conversion (P2T) module and a time-bin-to-polarization entanglement conversion (T2P) module. Detailed description of P2T and T2P modules can be found in U.S. non-provisional application no. TBD, filed Apr. 3, 2013, entitled "Method and Apparatus for Quantum Mechanical Entanglement Protection," which is incorporated herein by reference in its entirety. Accordingly, entangled photon pairs 112 and 114 are time-bin (time)-entangled photon pairs.

In another embodiment, module 108 includes a polarization-to-propagation direction entanglement conversion (P2D) module and a propagation direction-to-polarization entanglement conversion (D2P) module. Example descriptions of P2D and D2P modules are provided below with reference to FIGS. 7-9. Accordingly, entangled photon pairs 112 and 114 are propagation direction-entangled photon pairs. In an embodiment, module 108 includes a polarizing beam splitter (PBS) configured to split polarization-entangled photon pair 104 into first and second components with opposite propagation directions (which form entangled photon pair 112) within storage 110.

Photonic storage 110 is configured to receive entangled photon pair 112 from entanglement conversion module 108 and to store entangled photon pair 112 for as long as desired or within the limitations of the memory, such as the mean photon absorption per unit length. Within storage 110, the entanglement of photon pair 112 is preserved or substantially preserved within desired tolerances. At the direction of a control signal (not shown in FIG. 1), entangled photon pair 112 can be extracted from storage 110 as entangled photon pair 114, and then converted back to polarization-entangled photon pair 116 when ready for manipulation, processing, and measurement by a quantum application. Embodiments of storage 110 are provided below with reference to FIGS. 2-9.

In an embodiment, the operation of photonic quantum memory 106 is synchronized to external processing units, such as polarization-entangled photon pair generator 102, quantum gates, etc. This is done by having the cycle time of memory 106 tunable to high precision and by imposing constraints on the temporal coherence length of single photons. This ensures that necessary photon wavepacket overlap at optical elements (e.g., beam splitters) occurs with minimal timing mismatch. In embodiments, either the memory cycle time is tuned to the photon source (e.g., generator 102), or the source repetition rate is tuned to the memory cycle time. For a delay line based photonic memory (as discussed in embodiments below), adjusting the memory cycle time includes adjusting the idle path length.

Figure 2:
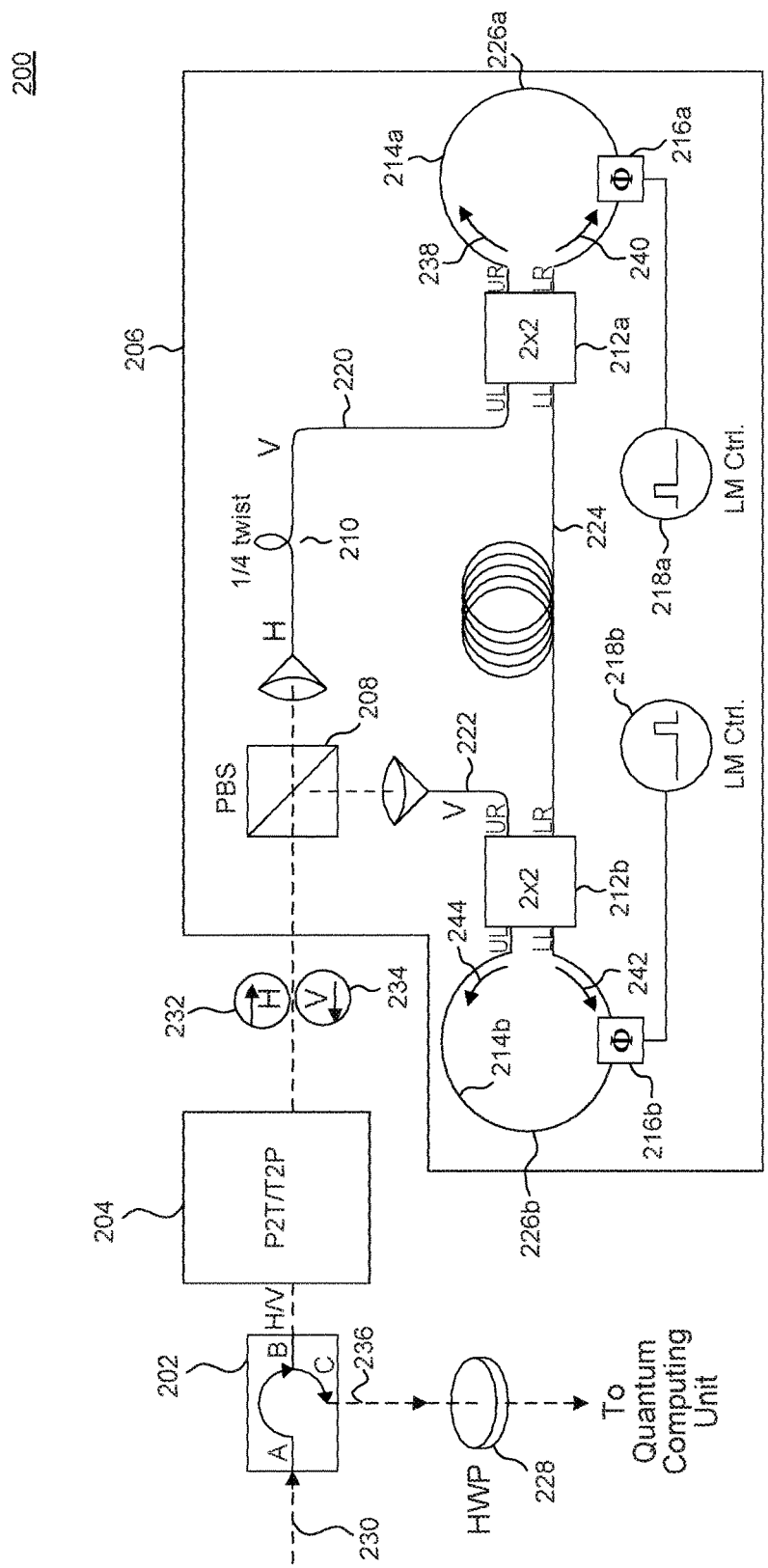
FIG. 2 illustrates an example photonic quantum memory according to an embodiment.

FIG. 2 illustrates an example photonic quantum memory 200 according to an embodiment. Example memory 200 is provided for the purpose of illustration only and is not limiting of embodiments. As shown in FIG. 2, example memory 200 includes a circulator 202, basis conversion module 204, and a photonic storage 206. Entanglement conversion module 202 includes a P2T module and a T2P module.

Storage 206 includes a linear race track photonic memory. As such, in an embodiment, photonic storage 206 includes a PBS 208; an entrance fiber optic path 220; an exit fiber optic path 222; a first controllable mirror, including a two-by-two (2×2) coupler 212a and a fiber optic loop 214a; a second controllable mirror, including a 2×2 coupler 212b and a fiber optic loop 214b; and a storage fiber optic path 224.

As shown in FIG. 2, PBS 208 is optically coupled to entrance fiber optic path 220 and to exit fiber optic path 222. Coupler 212a includes a first port (UL) coupled to entrance fiber optic path 220, a second port (UR) coupled to a first end of fiber optic loop 214a, a third port (LR) coupled to a second end of fiber optic loop 214a, and a fourth port (LL) coupled to storage fiber optic path 224. Coupler 212b includes a first port (UR) coupled to exit fiber optic path 222, a second port (UL) coupled to a first end of fiber optic loop 214b, a third port (LL) coupled to a second end of fiber optic loop 214b, and a fourth port (LR) coupled to storage fiber optic path 224. Fiber optic path 224 optically couples the first and second controllable mirrors by coupling the fourth port (LL) of coupler 212a and the fourth port (LR) of coupler 212b.

Fiber optic loops 214a and 214b include respective phase shifters 216a and 216b. In an embodiment, phase shifter 216a is coupled between the second end and a halfway point 226a of fiber optic loop 214a, and phase shifter 216b is coupled between the second end and a halfway point 226b of fiber optic loop 214b.

In operation, circulator 202 is configured to receive a photon 230 on a port A of circulator 202. For example, photon 230 can be a member of polarization-entangled photon pair generated by a polarization-entangled photon pair generator, such as polarization-entangled photon pair generator 102 described above in FIG. 1. Circulator 202 is configured to direct photon 230 from port A to a port B, thereby optically coupling photon 230 to basis conversion module 204. Circulator 202 does not affect the polarization of photon 230. Storage of entanglement necessitates storage of all photons emerging from the entangled source, in which case each single photon of an entangled photon pair takes a path similar to photon 230 within photonic quantum memory 200 as described herein. As would be understood by a person of skill in the art based on the teachings herein, each photon of the entangled photon pair can be stored in a respective photonic quantum memory 200 (a respective instance of photonic quantum memory 200).

Basis conversion module 204, via its P2T module, acts on photon 230 to generate a time-bin photon 232. In an embodiment, time-bin photon 232 is part of a time-bin entangled photon pair. In an embodiment, time-bin photon 232 includes an early component and a late component. Both time-bin components of each photon comprising the time-bin entangled photon pair have the same polarization, for example horizontal polarization as illustrated in FIG. 2. In another embodiment, the two components can both have vertical polarization at the output of basis conversion module 204.

Subsequently, time-bin photon 232 is input into photonic storage 206. In photonic storage 206, time-bin photon 232 is first acted upon by PBS 208, which optically couples (without deflection) time-bin photon 232 to entrance fiber optic path 220 due to its horizontal polarization. In entrance fiber optic path 220, the polarization of time-bin photon 232 is changed from horizontal to vertical by a quarter (¼) twist 210. It is noted that (¼) twist 210 does not affect the polarization of time-bin photon 232 relative to fiber optic path 220, but only re-orients it from horizontal to vertical relative to the outside world. Due to this change in polarization relative to the outside world, the time-bin photon is illustrated in FIG. 2 using a different numeral (234) when it is extracted from photonic storage 206, and will be subsequently referred to as time-bin photon 234 (instead of time-bin photon 232) when describing it after the application of (¼) twist 210. In another embodiment, (¼) twist 210 is replaced with a half wave plate (HWP) within entrance fiber optic path 220. Entrance fiber optic path 220 is polarization-maintaining fiber (PMF) and thus preserves the polarization of time-bin photon 232, before coupling it to coupler 212a.

As would be understood by a person of skill in the art, a subsequent photon (which can be the counterpart of time-bin photon 232 that forms a time-bin entangled photon pair with photon 232) is treated identically to photon 232 herein. Even though the operation of memory 200 is described herein with respect to a single photon, a person of skill in the art would understand the operation of memory 200 with respect to more than one photon, including a time-bin entangled group of photons. In an embodiment, the two photons comprising an entangled pair that are generated at the same instant in time could be appropriately delayed relative to each other, whereby each photon of the pair would be acted upon like photon 232 within the context of memory 200. After storage the relative delay is reversed in order to restore entanglement. In another embodiment, an identical copy of memory 200 is used for each photon of the entangled pair. Here we focus on only one photon of the pair, whereby the other photon is treated identically by a separate physical memory.

In an embodiment, coupler 212a equally divides the incoming time-bin photon 234 into a clockwise (CW) and a counter-clockwise (CCW) propagating components 238 and 240 exiting through the UR and LR ports, respectively. Specifically, coupler 212a is configured to receive the early component of time-bin photon 234 on its first port (UL) from entrance fiber optic path 220; direct via its second port (UR) a first component (hereinafter CW component) of the early component of time-bin photon 234 onto the first end of fiber optic loop 214a; and direct via its third port (LR) a second component (hereinafter CCW component) of the early component of the time-bin photon 234 onto the second end of fiber optic loop 214a. Thus, the CW component of the early component of the time-bin photon 234 travels from the first end to the second end of fiber optic loop 214a in a clockwise manner, and the CCW component of the early component of the time-bin photon 234 travels from the second end to the first end of fiber optic loop 214a in a counter-clockwise manner. The late component of time-bin photon 234 is treated identically as the early component by coupler 212a, as described herein.

While the CW component 238 of time-bin photon 234 is traveling from UR to LR of fiber optic loop 214a, a phase shift (e.g., half wavelength) is applied to the CCW component 240 via phase shifter 216a at the precise instant that the CCW component 240 passes through phase shifter 216a. In an embodiment, the phase shift is applied to the CCW component 240 responsive to a control signal 218a, which changes the index of refraction of phase shifter 216a at the precise instant that the CCW component 240 passes through phase shifter 216a. With the phase shift applied to the CCW component 240, the CW and CCW components 238 and 240 of the time-bin photon 234 acquire a relative phase shift between them. Accordingly, when the CW and CCW components 238 and 240 return to coupler 212a via the third port (LR) and the second port (UR) respectively, coupler 212a directs the CW and CCW components 238 and 240 via its fourth port (LL) onto storage fiber optic path 224 by way of constructive interference. The first controllable mirror thus acts in a transmissive fashion on the time-bin photon 234, allowing it to pass onto storage fiber optic path 224. It is noted that if no phase shift is applied to the CCW component 240, the CW and CCW components 238 and 240 would both be coupled to the first port (UL) of coupler 212a (the same port on which they came in) onto entrance fiber optic path 220, and the first controllable mirror acts in a reflective fashion.

In an embodiment, the length of loop 226a is such that the time required for the CW and CCW components 238 and 240 of time-bin photon 234 to traverse the loop is much longer than the time-separation between, for instance, the early and late components of the time-bin photon 234, in the time-bin basis.

Time-bin photon 234 then travels in storage fiber optic path 224 from coupler 212a to coupler 212b. When it reaches coupler 212b, time-bin photon 234 can be either reflected back onto storage fiber optic path 224 or passed through onto exit fiber optic path 222.

In an embodiment, coupler 212b equally divides the incoming time-bin photon 234 into a clockwise (CW) and a counter-clockwise (CCW) propagating components 242 and 244 exiting through the LL and UL ports, respectively. Specifically, in an embodiment, coupler 212b receives the time-bin photon 234 on its fourth port (LR) from storage fiber optic path 224; directs via its second port (UL) a CCW component of the early component of time-bin photon 234 onto the first end of fiber optic loop 214b; and directs via its third port (LL) a CW component of the early component of time-bin photon 234 onto the second end of fiber optic loop 214b. Thus, the CCW component of the early component of time-bin photon 234 travels from the first end to the second end of fiber optic loop 214b in a counter-clockwise manner, and the CW component of the early component of time-bin photon 234 travels from the second end to the first end of fiber optic loop 214b in a clockwise manner. The late component of time-bin photon 234 is treated identically as the early component by coupler 212b, as described herein.

While the CW component 242 of time-bin photon 234 is traveling from the second end to the first end of fiber optic loop 214b, a phase shift (e.g., half wavelength) can be applied to the CW component 242 via phase shifter 216b at the precise instant that the CW component 242 passes through phase shifter 216b. In an embodiment, the phase shift is applied to the CW component 242 responsive to a control signal 218b, which changes the index of refraction of phase shifter 216b at the precise instant that the CW component 242 passes through phase shifter 216b.

If a phase shift is applied to the CW component 242, the CCW and CW components 244 and 242 of time-bin photon 234 acquire a relative phase shift between them. Accordingly, when the CCW and CW components 244 and 242 return to coupler 212b via the third port (LL) and the second port (UL) respectively, coupler 212b directs the CCW and CW components 244 and 242 via its first port (UR) onto exit fiber optic path 222. The second controllable mirror thus acts in a transmissive fashion on time-bin photon 234, allowing it to pass onto exit fiber optic path 222. Alternatively, if no phase shift is applied to the CW component 242, the CCW and CW components 244 and 242 would both be coupled to the fourth port (LR) of coupler 212b (the same port on which they came in) onto storage fiber optic path 224, and the second controllable mirror acts in a reflective fashion.

In an embodiment, if the time-bin photon 234 is reflected by the second controllable mirror, time-bin photon 234 travels in storage fiber optic path 224 to the first controllable mirror, where it is again reflected onto storage fiber optic path 224. Time-bin photon 234 can be trapped, bouncing back and forth between the first and second controllable mirrors, for as long as desired. Storage fiber optic path 224 is polarization-maintaining fiber (PMF) and thus preserves the polarization of time-bin photon 234 when it travels through it.

When time-bin photon 234 is to be extracted from storage fiber optic path 224, a phase shift is applied using phase shifter 216b (as described above) onto the CCW component, causing the time-bin photon 234 to exit storage fiber optic path 224. Thus, in an embodiment, a first phase shift is applied using phase shifter 216a of the first controllable mirror to cause time-bin photon 234 to enter into storage fiber optic path 224, and a second phase shift is applied using phase shifter 216b to extract time-bin photon 234 from storage fiber optic path 224.

On exiting from coupler 212b onto exit fiber optic path 222, time-bin photon 234 has the same polarization (e.g., vertical polarization) as when it entered coupler 212a. Time-bin photon 234 travels through exit fiber optic path 222 and is then optically coupled to PBS 208, which deflects time-bin photon 234 out of photonic storage 206 towards basis conversion module 204.

Basis conversion module 204, via its T2P module, acts on time-bin photon 234 to generate a polarization-based photon 236. In an embodiment, time-bin photon 234 is a member of a time-bin entangled photon pair, which is acted upon by the T2P module to produce a polarization-entangled photon pair. The two components of the polarization-entangled photon pair have opposite polarizations (horizontal and vertical) but overlap each other in time. Polarization-based photon 236 is then coupled to circulator 202. Circulator 202 is configured to direct polarization-based photon 236 from port B to a port C, thereby forwarding polarization-based photon 236 towards a quantum computing unit, for example.

Polarization-based photon 236 is passed through a half wave plate (HWP) 228 to undo a polarization shift, resulting in a photon that is identical to photon 230. In an embodiment, HWP 228 can be integrated within the T2P module.

Figure 3:
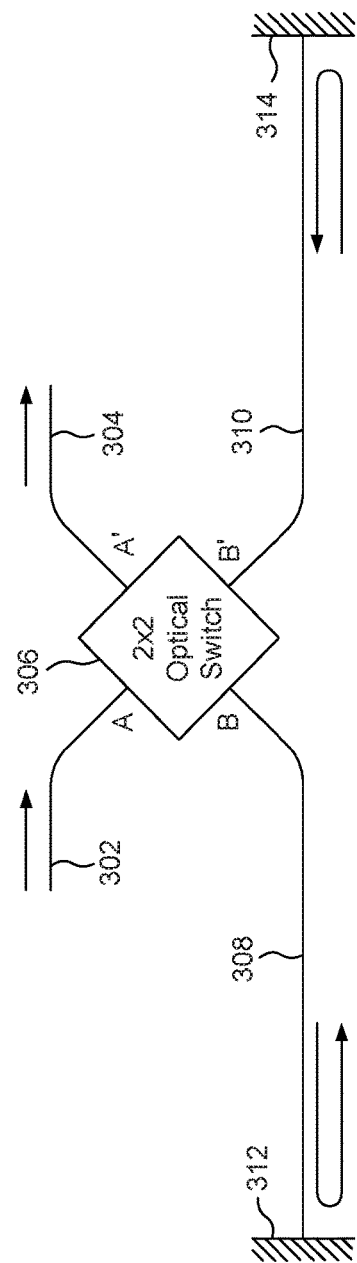
FIG. 3 illustrates an example photonic storage according to an embodiment.

FIG. 3 illustrates an example photonic storage 300 according to an embodiment. Example photonic storage 300 is provided for the purpose of illustration and is not limiting of embodiments. Example photonic storage 300 can be used together with basis conversion module 204, for example, to implement a photonic quantum memory according to an embodiment.

As shown in FIG. 3, example photonic storage 300 includes a 2×2 optical switch 306 having a first port (A), a second port (A'), a third port (B), and a fourth port (B'); a first delay line 308 having a first end coupled to the third port (B) of 2×2 optical switch 306 and a second end capped by a first mirror 312; and a second delay line 310 having a first end coupled to the fourth port (B') of 2×2 optical switch 306 and a second end capped by a second mirror 314. In an embodiment, 2×2 optical switch 306 includes a Mach Zehnder Interferometer with electrically controlled phase shift between the interferometer arms to constitute an active optical switch.

In an embodiment, switch 306 is configured to receive a photon 302 on its first port (A). If switch 306 in the ON state, photon 302 (both its early and late component) is coupled from first port (A) via third port (B) to second delay line 310. Otherwise, photon 302 is coupled to second port (A') to result in photon 304. In an embodiment, to store photon 302 in storage 300, switch 306 is turned ON when photon 302 approaches switch 306 on first port (A). This couples photon 302 to second delay line 310 where it travels until it is reflected by second mirror 314. On returning to switch 306, switch 306 is maintained OFF to couple photon 302 to first delay line 308 from ports B to B'. Photon 302 travels in first delay line 308, is reflected by first mirror 312, and returns to switch 306. The photon is now trapped between the mirrors 312 and 314 and the B->B' (B'->B) path of the switch. To extract photon 302 from photonic storage 300, switch 306 is turned ON as photon 302 approaches switch 306 on first delay line 308, which couples photon 302 from third port (B) to second port (A'), to result in photon 304. If switch 306 is maintained OFF as photon 302 approaches switch 306 on first delay line 308, then photon 302 is coupled again to second delay line 310.

Figure 4:
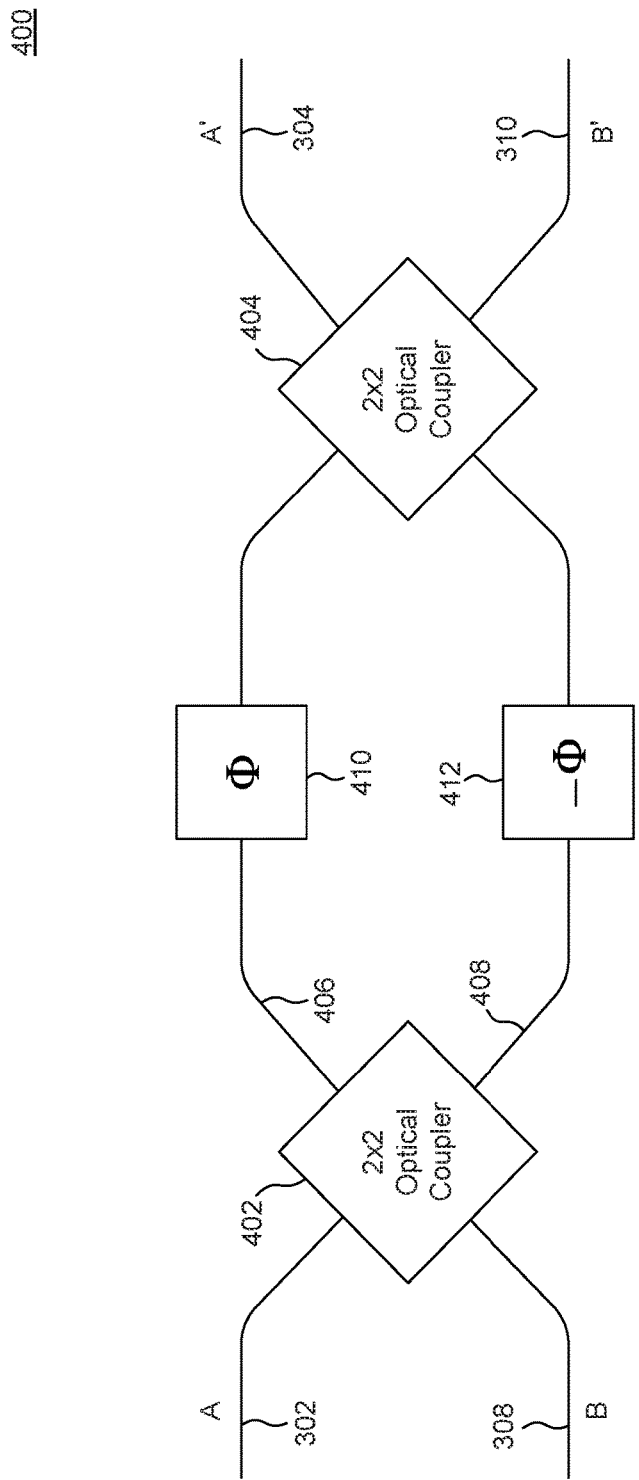
FIG. 4 illustrates an example 2×2 optical switch according to an embodiment.

FIG. 4 illustrates an example 2×2 optical switch 400 according to an embodiment. Example switch 400 is provided for the purpose of illustration only and is not limiting of embodiments. Example switch 400 may be an embodiment of switch 306 of example photonic storage 300 described above.

As shown in FIG. 4, example switch 400 includes a first 2×2 optical coupler 402 and a second 2×2 optical coupler 404, coupled by an upper path 406 and a lower path 408. Upper path 406 includes a phase shifter 410 and lower path 408 includes a phase shifter 412.

In operation, coupler 402 receives a photon 302 on port A as shown in FIG. 4. Coupler 402 acts on photon 302 sending a first portion onto upper path 406 and a second portion onto lower path 408. For the sake of discussion, it is assumed that the first portion and the second portion are equal. It should be understood however that in other embodiments the first and second portions can be unequal. The first portion acquires a +90 degrees phase shift in the process of being deflected by coupler 402 onto upper path 406, but the second portion does not acquire any phase shift by being coupled to lower path 408.

If phase shifters 410 and 412 are disabled as the first and second portions travel through them respectively, when the first and second portions reach coupler 404, they add up constructively at port B' and are thus coupled to second delay line 310. Specifically, the first portion acquires a second +90 degrees phase shift as coupler 404 deflects it from upper path 406 onto port A', resulting in the first and second portions being 180 degrees out-of-phase at A'. As a result, the first and second portions cancel each other out at port A' and combine constructively at port B'. The first and second portions thus combine at port B', travel through second delay line 310, and are reflected by second mirror 314. The same process is repeated on the return path if phase shifters 410 and 412 are disabled, which results in the first and second portions combining constructively at port A. Thus, when phase shifters 410 and 412 are disabled, the light input at port A is coupled to port B' and the light input at port B' is coupled to port A.

In an embodiment, in order to couple the light input at port A to port B, phase shifts are applied to the first and second portions as they return from port B' (after being initially coupled from A to B'). For example, in an embodiment, the first portion is passed through coupler 404 without phase shift onto upper path 406, and the second portion is deflected by coupler 404 onto lower path 408 acquiring a +90 degrees phase shift. For the two portions to combine constructively at port B, they must be in-phase with one another after being acted upon by coupler 402. Accordingly, in an embodiment, the first portion is acted upon by phase shifter 410 as it travels through phase shifter 410 to acquire a +90 degrees phase shift. The second portion, which has already acquired a +90 degrees phase shift in passing through coupler 404, is acted upon by phase shifter 412 to retard it by a −90 degrees phase shift, resulting in the second portion having no phase shift. At coupler 402, the first portion is passed without affecting its phase shift (+90 degrees), and the second portion is deflected acquiring a +90 degrees phase shift. As a result, the first and second portions will be in-phase at port B and out-of-phase at port A.

Figure 5:
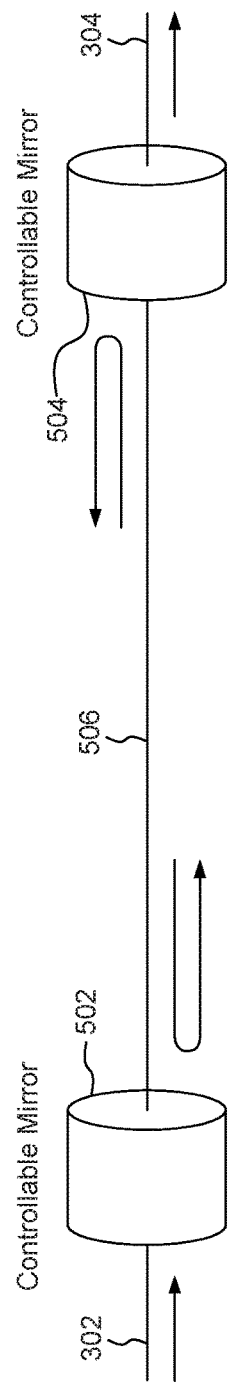
FIG. 5 illustrates another example photonic storage according to an embodiment.

FIG. 5 illustrates another example photonic storage 500 according to an embodiment. Example photonic storage 500 is provided for the purpose of illustration and is not limiting of embodiments. Example photonic storage 500 can be used together with basis conversion module 204, for example, to implement a photonic quantum memory according to an embodiment.

As shown in FIG. 5, example photonic storage 500 includes a first controllable mirror 502, a second controllable mirror 504, and a delay line 506. First controllable mirror 502 includes a first port, which can be coupled to basis conversion module 204 for receiving a photon 302, and a second port coupled to delay line 506. Second controllable mirror 504 includes a first port coupled to delay line 506 and a second port, which can be coupled to basis conversion module 204 for outputting a photon 304. In an embodiment, both controllable mirrors 502 and 504 include an electro-optical loop mirror.

In an embodiment, first controllable mirror 502 is configured to receive a photon 302 on its first port and to couple photon 302 via its second port to delay line 506. Second controllable mirror 504 is configured to receive photon 302 on its first port from delay line 506, and to either reflect photon 302 via the first port back onto delay line 506 or direct photon 302 via its second port out of photonic storage 500 as photon 304. Thus, first and second controllable mirrors 502 and 504 can be operated to create a photon trapping cavity between them. Photons can be extracted from the photon trapping cavity by controlling second controllable mirror 504 into a transmissive state.

Figure 6:
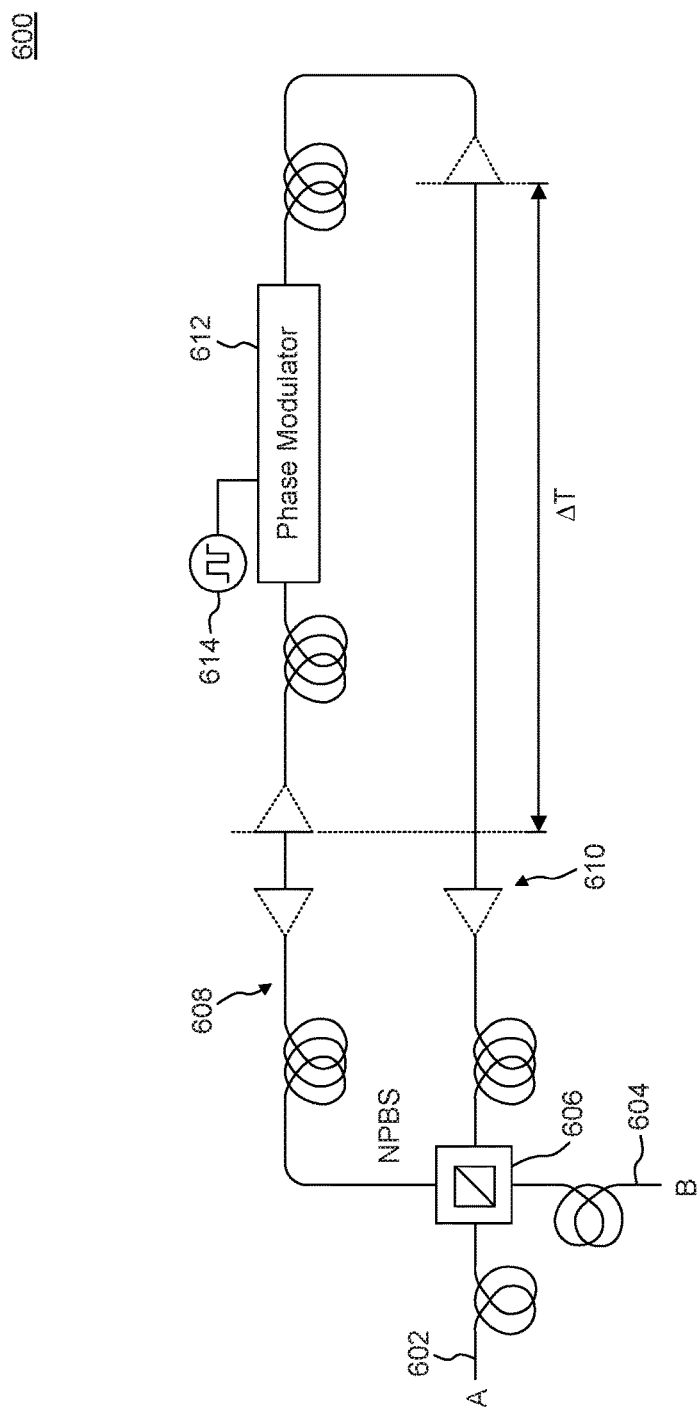
FIG. 6 illustrates an example controllable mirror according to an embodiment.

FIG. 6 illustrates an example controllable mirror 600 according to an embodiment. Example controllable mirror 600 is provided for the purpose of illustration only and is not limiting of embodiments. Example controllable mirror 600 can be an embodiment of first and second controllable mirrors 502 and 504 described above in FIG. 5.

As shown in FIG. 6, example controllable mirror 600 includes a 50% reflecting/50% transmitting non-polarizing beam splitter (NPBS) 606 having a first input 602 and a second input 604, and an optical loop comprised of a first path 608 and a second path 610. The optical loop includes a phase modulator (shifter) 612, which can be controlled by a control signal 614.

In operation, NPBS 606 can receive light on either first input 602 or second input 604. By controlling phase modulator 612, the light can be made to exit NPBS 606 (after traveling through the loop) from either the same input it was received on or the other input. Specifically, in an embodiment, when light is received on either first input 602 or second input 604, the light is split into two portions between the first and second paths 608 and 610. The two portions counter-propagate in the loop and then return to NPBS 606. If the two portions have the same phase shift on their return to NPBS 606, the two portions interfere constructively on the same input that the light was initially received on. Alternatively, if the two portions acquire a relative phase shift in the loop, the two portions interfere constructively on the other input.

In an embodiment, relative phase shift between the two portions can be introduced by changing the bias applied to phase modulator 612 (via control signal 614) after one portion has passed through phase modulator 612 but the other portion has not. This is ensured by placing phase modulator 612 off center in the loop such that there is sufficient time for the bias of phase modulator 612 to be changed between one portion passing through phase modulator 612 and the other portion arriving at phase modulator 612.

Figure 7:
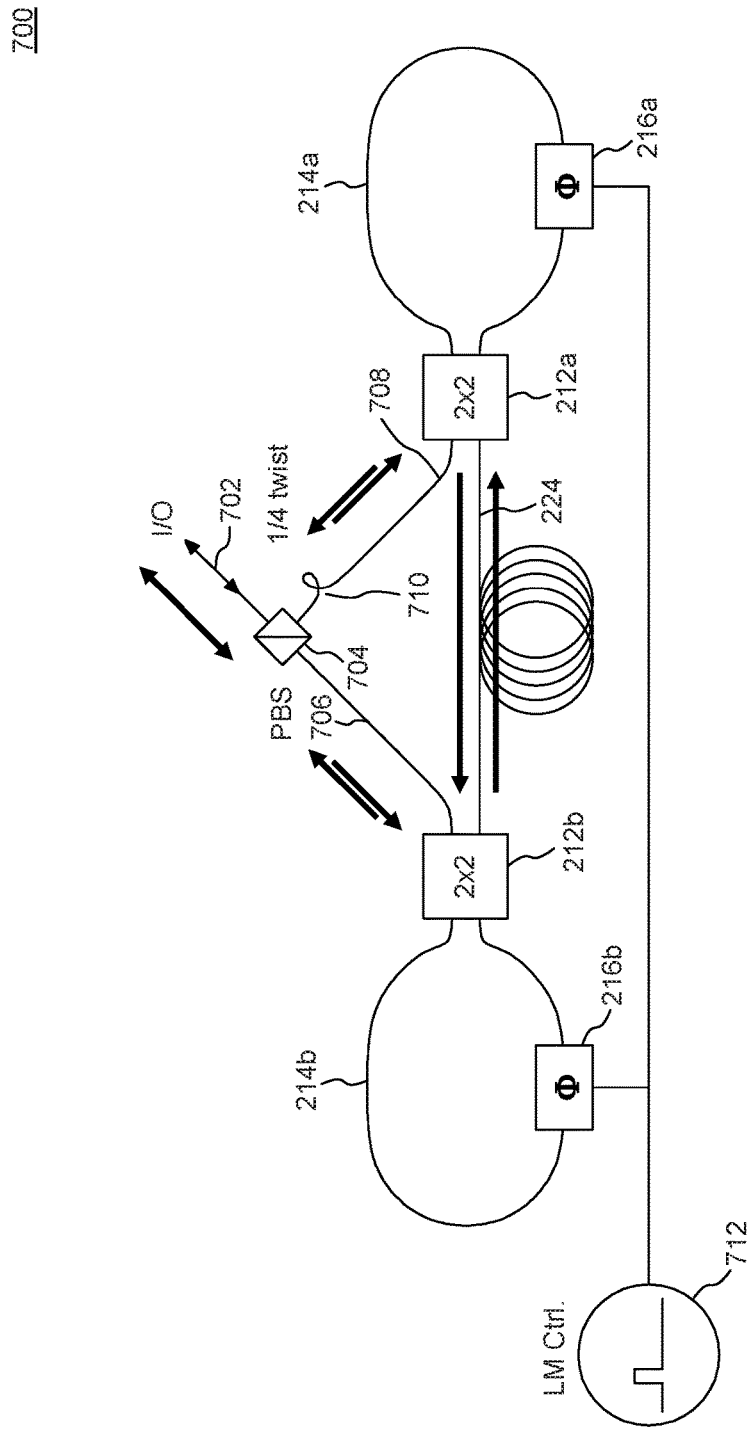
FIG. 7 illustrates an example photonic quantum memory according to an embodiment.

FIG. 7 illustrates an example photonic quantum memory 700 according to an embodiment. Example photonic quantum memory 700 is provided for the purpose of illustration only and is not limiting of embodiments. As shown in FIG. 7, example memory 700 includes a PBS 704; a first path 706; a second path 708; a first controllable mirror, including a 2×2 coupler 212a and a fiber optic loop 214a; a second controllable mirror, including a 2×2 coupler 212b and a fiber optic loop 214b; and a storage fiber optic path 224. PBS 704, first path 706, and second path 708 represent a polarization-to-propagation direction conversion (P2D) module, capable of receiving a polarization-based photon and generating a propagation direction-based photon. The propagation direction-based photon can be stored in the photonic storage provided by the first and second controllable mirrors and storage fiber optic path 224.

In operation, PBS 704 receives a polarization-based photon 702. Polarization-based photon 702 may be a member of a polarization-entangled photon pair generated by a polarization-entangled photon pair generator, such as polarization-entangled photon pair generator 102 described above in FIG. 1. PBS 704 is configured to direct polarization-based photon 702 into first path 706 or second path 708 based on its polarization. In an embodiment, second path 708 includes a quarter (¼) twist 710, which re-orients the polarization of the photon 702. In another embodiment, quarter (¼) twist 710 can be replaced by a half-wave plate.

Operation of the photonic storage (provided by the first and second controllable mirrors and storage fiber optic path 224) of quantum memory 700 is apparent to a person of skill in the art based on the description provided with reference to FIG. 2 above and will not be fully described herein.

Figure 8:
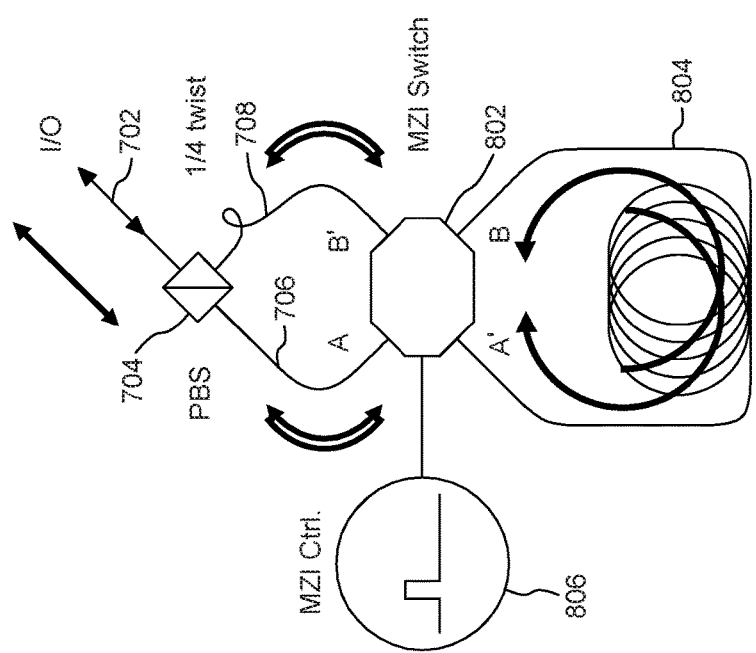
FIG. 8 illustrates an example photonic quantum memory according to an embodiment.

FIG. 8 illustrates another example photonic quantum memory 800 according to an embodiment. Example photonic quantum memory 800 is provided for the purpose of illustration only and is not limiting of embodiments. Like example memory 700, example memory 800 includes a PBS 704, a first path 706, and a second path 708, which represent a polarization-to-propagation direction conversion (P2D) module. Example memory 800 further includes a Mach Zehnder Interferometer (MZI) switch 802 and a fiber optic loop 804. MZI switch 802 includes a first port (A) coupled to first path 706, a second port (B') coupled to second path 708, a third port (A') coupled to a first end of fiber optic loop 804, and a fourth port (B) coupled to a second end of fiber optic loop 804.

In an embodiment, MZI switch 802 receives polarization-based photon 702 on first port A and/or on second port B'. With MZI switch 802 turned off, photon 702 is coupled from first port A to fourth port B and/or from second port B' to third port A'. Photon 702 propagates inside loop 804 returning at third port A' and/or fourth port B of MZI switch 802. To maintain photon 702 in the memory, MZI switch 802 is then controlled by control signal 806 such that photon 702 is coupled from third port A' to fourth port B (instead of second port B') and/or from fourth port B to third port A' (instead of first port A). Photon 702 will thus return into fiber optic loop 804. On subsequent returns to MZI switch 802, MZI switch 802 is maintained off if photon 702 is desired to return to fiber optic loop 804. When photon 702 is desired to be extracted from fiber optic loop 804, MZI switch 802 is controlled again such that the light on port B again couples to port A and/or the light on port A' again couples to port B'.

Figure 9:
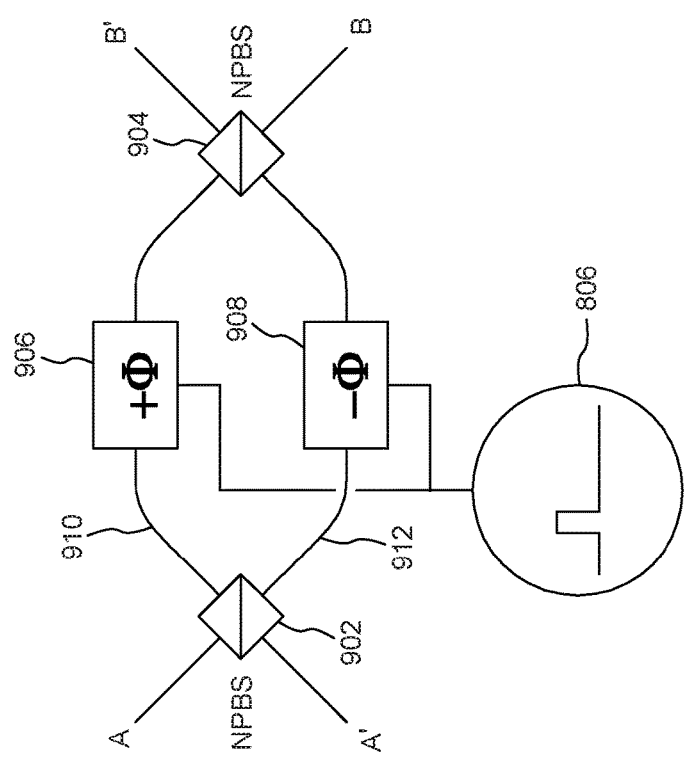
FIG. 9 illustrates an example Mach Zehnder Interferometer (MZI) switch according to an embodiment.

FIG. 9 illustrates an example MZI switch 900 according to an embodiment. Example MZI switch 900 is provided for the purpose of illustration only and is not limiting of embodiments. Example MZI switch 900 can be an embodiment of MZI switch 802 described above in FIG. 8. As shown in FIG. 9, example MZI switch 900 includes a first NPBS 902 and a second NPBS 904, coupled by an upper path 910 and a lower path 912. Upper path 910 includes a phase shifter 906 and lower path 912 includes a phase shifter 908. Phase shifters 906 and 908 are controlled by a control signal 806.

In operation, MZI switch 900 is similar to example 2×2 optical switch 400 described above in FIG. 4. Operation of MZI switch 900 would be apparent to a person of skill in the art based on the teachings herein and is therefore not described herein.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A memory device, comprising:
   a polarization-to-time-bin entanglement conversion (P2T) module configured to receive a polarization-entangled photon pair and to generate a time-bin entangled photon pair; and
   a storage module configured to store the time-bin entangled photon pair, wherein the storage module comprises an entrance fiber optic path coupled to a first controllable mirror, an exit fiber optic path coupled to a second controllable mirror, and a storage fiber optic path coupling the first and second controllable mirrors.

2. The memory device of claim 1, further comprising a time-bin-to-polarization entanglement conversion (T2P) module configured to receive the time-bin entangled photon pair and to re-generate the polarization-entangled photon pair based on the time-bin entangled photon pair.

3. The memory device of claim 2, further comprising a polarizing beam splitter configured to:
   receive a photon of the time-bin entangled photon pair from the P2T module and to direct the photon to the entrance fiber optic path; and
   receive the photon from the exit fiber optic path and to direct the photon to the T2P module.

4. The memory device of claim 1, wherein the entrance fiber optic path is configured to change a photon of the time-bin entangled photon pair from a horizontal orientation to a vertical orientation by a quarter twist.

5. The memory device of claim 1, wherein the first controllable mirror comprises a coupler with first, second, third, and fourth ports and a fiber optic loop, and wherein:
   the first port is coupled to the entrance fiber optic path;
   the second port is coupled to a first end of the fiber optic loop;
   the third port is coupled to a second end of the fiber optic loop; and
   the fourth port is coupled to the storage fiber optic path.

6. The memory device of claim 5, wherein the fiber optic loop comprises:
   a phase shifter; and
   a control module configured to adjust an index of refraction associated with the phase shifter.

7. The memory device of claim 1, wherein the second controllable mirror comprises a coupler with first, second, third, and fourth ports and a fiber optic loop, and wherein:
   the first port is coupled to the exit fiber optic path;
   the second port is coupled to a first end of the fiber optic loop;
   the third port is coupled to a second end of the fiber optic loop; and
   the fourth port is coupled to the storage fiber optic path.

8. The memory device of claim 1, wherein the storage fiber optic path comprises a polarization-maintaining fiber.

9. A method, comprising:
   receiving a polarization-entangled photon pair;
   generating a time-bin entangled photon pair based on the polarization-entangled photon pair; and storing, in a storage module, the time-bin entangled photon pair, wherein the storage module comprises an entrance fiber optic path coupled to a first controllable mirror, an exit fiber optic path coupled to a second controllable mirror, and a storage fiber optic path coupling the first and second controllable mirrors.

10. The method of claim 9, further comprising:
receiving the time-bin entangled photon pair; and
re-generating the polarization-entangled photon pair based on the time-bin entangled photon pair.

11. The method of claim 9, wherein storing the time-bin entangled photon pair comprises changing a photon of the time-bin entangled photon pair from a horizontal orientation to a vertical orientation by a quarter twist.

12. The method of claim 9, wherein storing the time-bin entangled photon pair comprises maintaining a polarization of the time-bin entangled photon pair.

13. A system, comprising:
a memory device configured to store photons, the memory device comprising:
 a polarization-to-time-bin entanglement conversion (P2T) module configured to receive a polarization-entangled photon pair and to generate a time-bin entangled photon pair;
 a storage module configured to store the time-bin entangled photon pair, wherein the storage module comprises an entrance fiber optic path coupled to a first controllable mirror, an exit fiber optic path coupled to a second controllable mirror, and a storage fiber optic path coupling the first and second controllable mirrors; and
 a time-bin-to-polarization entanglement conversion (T2P) module configured to receive the time-bin entangled photon pair and to re-generate the polarization-entangled photon pair based on the time-bin entangled photon pair; and
a computing unit configured to access the re-generated polarization-entangled photon pair from the memory device.

14. The system of claim 13, further comprising:
a circulator module configured to direct the photons from a first port to a second port coupled to the P2T conversion module and to direct the re-generated polarization-entangled photon pair from the T2P module to the computing unit.

15. The system of claim 14, further comprising:
a half wave plate positioned between the circulator module and the computing unit to adjust a polarization shift in the re-generated polarization-entangled photon pair.

16. The system f claim 13, wherein the memory device further comprises a polarizing beam splitter configured to:
receive a photon of the time-bin entangled photon pair from the P2T module and to direct the photon to the entrance fiber optic path; and
receive the photon from the exit fiber optic path and to direct the photon to the T2P module.

17. The system of claim 13, wherein the entrance fiber optic path is configured to change a photon of the time-bin entangled photon pair from a horizontal orientation to a vertical orientation by a quarter twist.

18. The system of claim 13, wherein the first controllable mirror comprises a coupler with first, second, third, and fourth ports and a fiber optic loop, and wherein:
the first port is coupled to the entrance fiber optic path;
the second port is coupled to a first end of the fiber optic loop;
the third port is coupled to a second end of the fiber optic loop; and
the fourth port is coupled to the storage fiber optic path.

19. The system of claim 18, wherein the fiber optic loop comprises:
a phase shifter; and
a control module configured to adjust an index of refraction associated with the phase shifter.

20. The system of claim 13, wherein the storage fiber optic path comprises a polarization-maintaining fiber.

* * * * *